United States Patent [19]

Wright

[11] 4,388,775
[45] Jun. 21, 1983

[54] TRAP FOR SMALL ANIMALS

[76] Inventor: Newton E. Wright, R.R. 3, Box 508, Abingdon, Va. 24266

[21] Appl. No.: 208,200

[22] Filed: Nov. 19, 1980

Related U.S. Application Data

[63] Continuation-in-part of Ser. No. 108,718, Dec. 31, 1979, abandoned.

[51] Int. Cl.³ .......................................... A01M 23/04
[52] U.S. Cl. ........................................................ 43/69
[58] Field of Search ................... 43/64, 69, 70, 71, 72, 43/74

[56] References Cited

U.S. PATENT DOCUMENTS

| 100,779 | 3/1870 | Lyman | 43/69 |
|---|---|---|---|
| 1,425,410 | 8/1922 | Newman | 43/69 |
| 1,436,272 | 11/1922 | McEliresh | 43/69 |
| 1,557,558 | 10/1925 | Cherbonnier | 43/69 |
| 1,864,664 | 6/1932 | Muhleiser | 43/69 |
| 2,122,147 | 6/1938 | Lamp | 43/69 |
| 2,410,990 | 11/1946 | Miller | 43/69 |
| 2,433,919 | 1/1948 | Mitchell | 43/69 |
| 2,822,639 | 2/1958 | Kelly et al. | 43/69 |
| 3,778,923 | 12/1973 | Cuoco | 43/69 |

FOREIGN PATENT DOCUMENTS

| 8623 | 12/1899 | Norway | 43/69 |
|---|---|---|---|
| 82384 | 1/1935 | Sweden | 43/69 |

Primary Examiner—Nicholas P. Godici
Assistant Examiner—M. Jordan
Attorney, Agent, or Firm—Frost & Jacobs

[57] ABSTRACT

A trap for small rodents and the like comprising a vessel having an open upper end and a removable cover assembly for the upper end of the vessel. The vessel is adapted to be located in the ground with its open upper end extending above ground level by an amount sufficient to receive the cover assembly. At least one opening is provided in the cover assembly. A support is attached to the cover assembly and extends vertically downwardly and axially of the vessel. A universally tiltable platform is mounted on the lower end of the support. The vessel may be about one-quarter filled with water.

14 Claims, 5 Drawing Figures

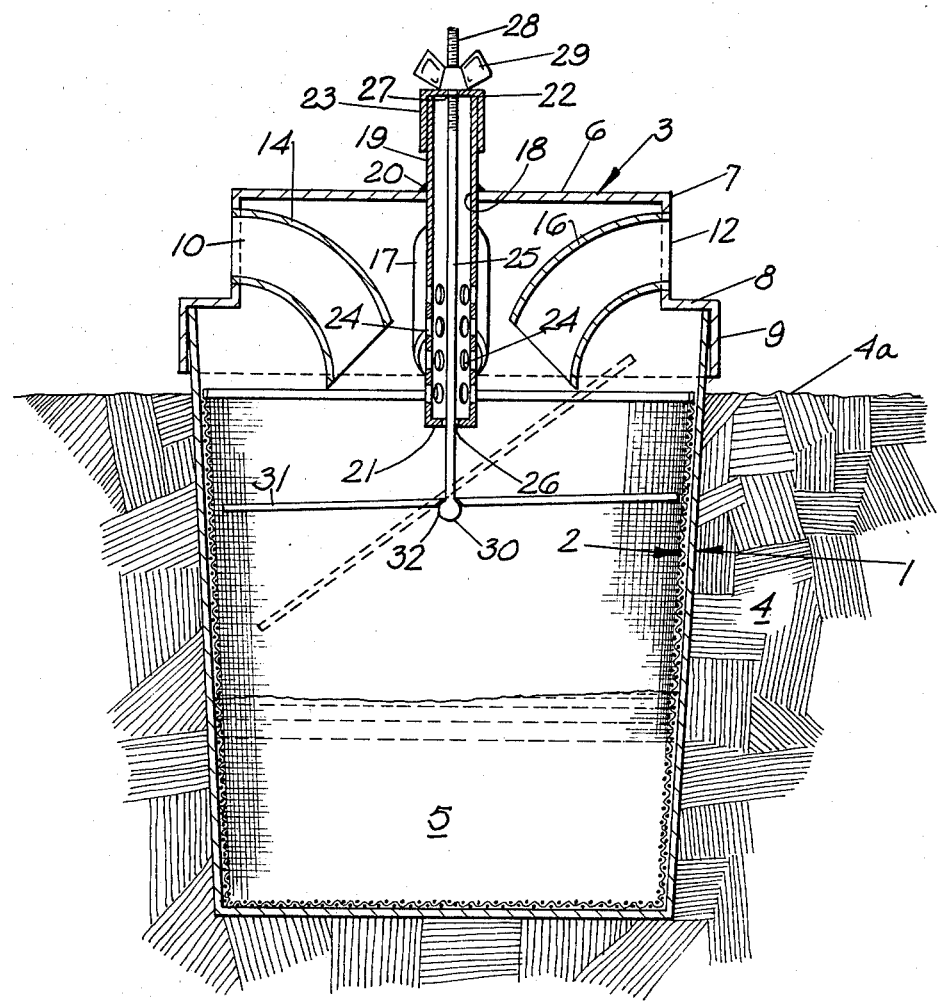

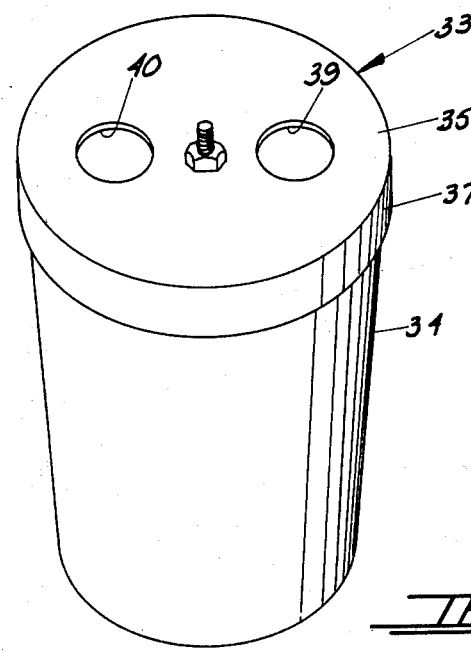
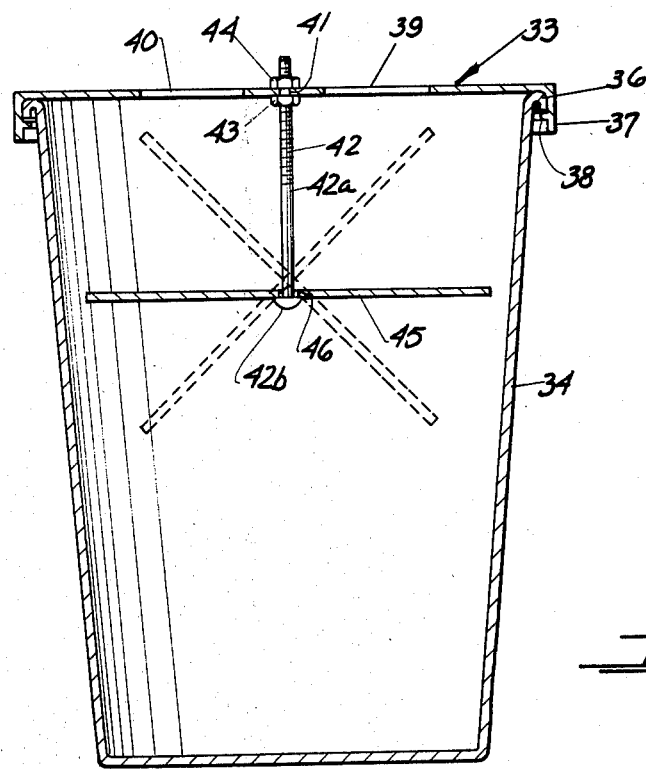

TRAP FOR SMALL ANIMALS

REFERENCE TO RELATED APPLICATION

This is a continuation-in-part application of copending application Ser. No. 6/108,718, filed Dec. 31, 1979 now abandoned, in the name of the same inventor and entitled TRAP FOR SMALL ANIMALS.

TECHNICAL FIELD

The invention relates to a trap for small animals, and more particularly to such a trap utilizing a universally tiltable support platform and a water bath.

BACKGROUND ART

Prior art workers have devised many types of small animal traps involving a water bath in association with some form of balance means which, upon becoming unbalanced by the weight of the animal, will dump the animal into the water bath. U.S. Pat. No. 124,838 teaches an open top vessel partially filled with water. The open top of the vessel is spanned by a bridge, the central portion of which constitutes a bait-containing tilting table. As a small animal crosses the bridge and steps upon the tilting table, he is caused to fall into the water bath. U.S. Pat. No. 141,346 illustrates a somewhat more complex structure comprising a center chamber partially filled with water. A bait container is mounted above the water bath and a series of radially oriented passages lead toward the bait container. The bottom surface of each passage comprises a tiltable trap door which will shift from beneath the animal as he approaches the bait container, causing the animal to fall into the water bath. Means are provided to enable the trap doors to be delicately balanced so that even an insect will trip them.

U.S. Pat. No. 1,635,224 teaches a drum-like vessel, the lower portion of which is filled with water. A pair of diametrically opposed openins is formed in the side wall of the drum above the water bath. A tubular conduit or passage is pivotally mounted within the drum with its ends communicating with the openings in the drum side wall. Means are provided to support bait within and centrally of the tubular passage. As an animal passes through one of the side wall openings and enters the tubular passage, his weight will cause the tubular passage to pivot with the result that the animal will fall into the water bath.

U.S. Pat. No. 2,490,540 illustrates a small animal trap comprising a chamber surmounted by a pivoted and balanced tubular member. A small animal is enticed into the tubular member through the use of bait. The tubular member will become unbalanced by virtue of the animal's weight, discharging the animal into the chamber. The tubular member will thereafter return to its normal horizontal position trapping the animal within the chamber. In a second embodiment, the chamber, itself, may be mounted over a water bath to drown the animal.

U.S. Pat. No. 3,778,923 describes an automatic mouse trap device comprising a drowning receptacle having a cover. The cover supports a horizontal runway tube which is tiltable through an elongated slot in the receptacle cover. A rodent passing through the runway tube will cause the tube to become unbalanced and tilt downwardly, discharging the animal into the drowning receptacle. The runway tube will thereafter return to its normal horizontal position.

The references described above are exemplary of those directed to small animal traps utilizing a tilting member which will discharge the animal into a water bath. While effective, such traps are generally characterized by complex construction and the requirement to carefully balance and counterbalance the tilting member. In order for the animal to be trapped, he must pass along the tilting member to the extent that his body weight will cause the member to tilt. Sometimes the slightest movement of the tilting member will cause a wary animal to back off and avoid being trapped.

The trap of the present invention is extremely simple in construction, and, as will be described hereinafter, can be configured to be used with a preexisting vessel containing a water bath. The tilting platform of the trap to be described is free floating and does not require delicate balancing and counterbalancing. The animal approaching the tilting platform of the present invention has already assumed a downwardly attitude and the platform will give way from beneath the animal regardless of the animal's weight.

DISCLOSURE OF THE INVENTION

In accordance with the invention there is provided a trap for small animals such as rodents and the like. In a first embodiment, the trap comprises a vessel having an open upper end. A removable foraminous liner is located in the vessel to assist in removal of the trapped animal. If the trap is intended to kill the animal, the vessel may be partially filled with water so that the animal is caused to drown. The vessel is located in the ground with its open upper end extending above ground level by an amount sufficient to enable a cover assembly to be mounted thereon.

The cover assembly supports a vertical tubular bait container extending axially of the vessel with its lower end closed and extending below the cover assembly and its upper end open, extending above the cover assembly and provided with a removable cap by which the bait container can be filled. The side wall of the tubular bait container is provided with a plurality of perforations at its lower end thereby exposing the bait therein.

The cover assembly for the vessel has a substantially vertical wall portion provided with at least one opening therein. Perferably, a plurality of openings are provided in the vertical wall portion so that the trap may be approached from various sides. Each opening leads to a curved conduit extending inwardly and downwardly thereof toward the lower end of the tubular bait container.

A support is attached to the tubular bait container and extends vertically and axially of the vessel. A tiltable platform is mounted on the lower end of the support at a level above the water in the vessel and below the lower end of the tubular bait container. The platform is universally tiltable in all directions under the weight of an animal and normally assumes a substantially horizontal position.

In a second embodiment, a vessel is provied which again can be located in the ground, or simply can be rested upon the surface of the ground or other suitable support surface. In this embodiment a removable cover is provided having at least one opening therein. The cover can be planar, if desired. A support is affixed to the cover and depends downwardly into the vessel, axially thereof. A universally tiltable platform is mounted at the lowermost end of the support.

BRIEF DESCRIPTION OF THE DRAWINGS

FIG. 3 is a cross sectional, elevational view taken along section line 3—3 of FIG. 2 and illustrates the trap positioned in the ground.

FIG. 4 is a perspective view of a second embodiment of the trap of the present invention.

FIG. 5 is a cross sectional elevational view of the trap of FIG. 4.

BEST MODE OF CARRYING OUT THE INVENTION

Figure 1:
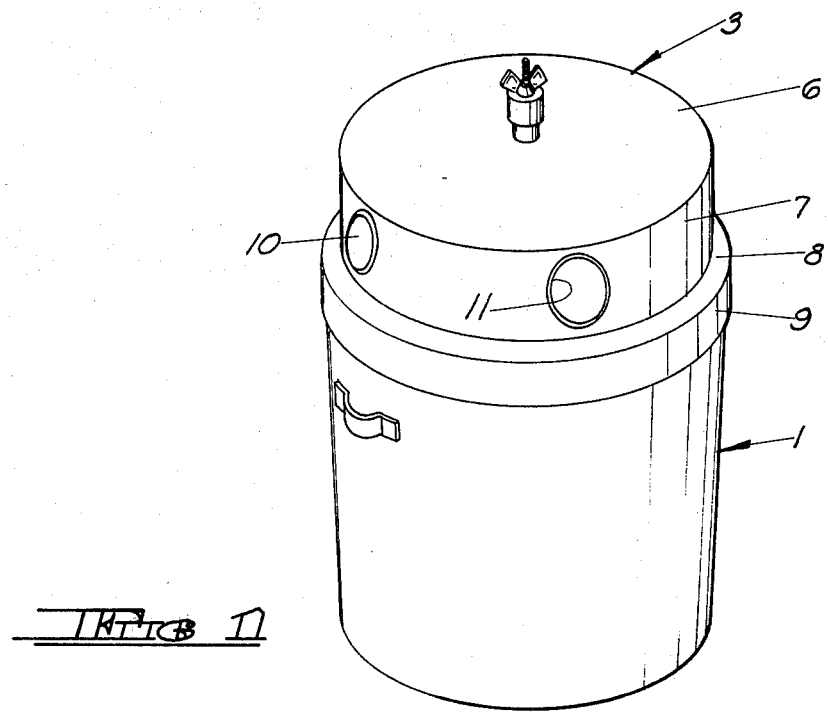
FIG. 1 is a perspective view of the trap of the present invention.
Figure 2:
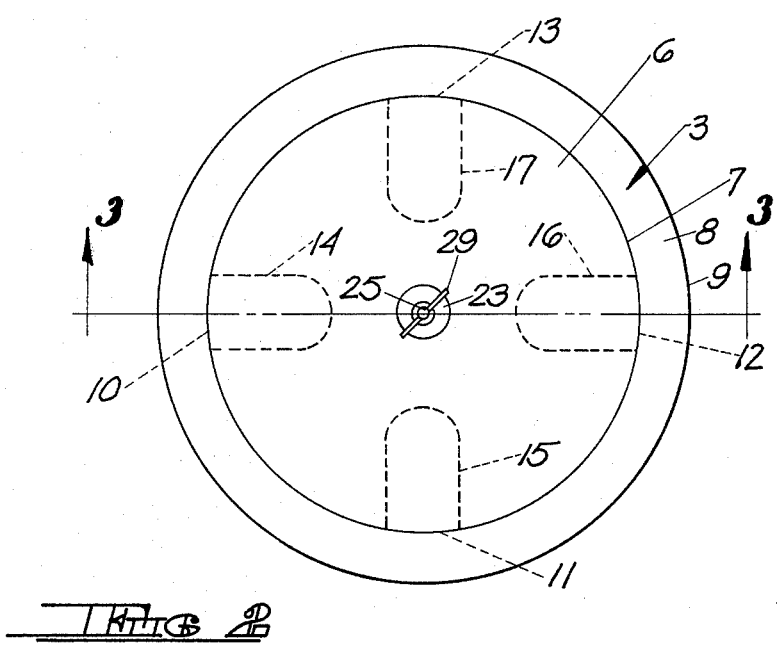
FIG. 2 is a top plan view of the trap of FIG. 1.

In FIGS. 1 through 3 like parts have been given like index numerals. The trap of the present invention comprises three basic parts: a vessel generally indicated at 1, a foraminous liner (see FIG. 3) for the vessel generally indicated at 2 and a cover assembly, generally indicated at 3. The vessel 1 may be of any appropriate type capable of being buried in the ground. The vessel may be a concrete septic tank, a rectangular box, a barrel, a drum or the like. The vessel preferably should be capable of holding water, as will be evident hereinafter. For purposes of an exemplary showing, the vessel 1 is illustrated as being a conventional garbage can of plastic or metallic construction.

The vessel 1 is shown in FIG. 3 as being buried in the ground 4 with its open upper end extending above ground level 4a by an amount sufficient to accommodate cover assembly 3. The vessel 1 may be buried directly in the ground as shown in FIG. 3, or a hole may be prepared therefor and lined with concrete, metal or the like.

The trap of the present invention may be used simply to capture small animals. However, it may also be used to trap and kill small animals. In the latter instance, the vessel may be partially filled with water so that the trapped animal will drown. A water bath is shown at 5 and constitutes from about one-fourth to about one-third the volume of vessel 1.

The purpose of liner 2 is to assist in the removal of the captured or drowned animal. When vessel 1 is intended to contain water bath 5, liner 2 is preferably foraminous so that, upon removal of cover assembly 3, the liner 2 can be lifted from vessel 1 with water bath 5 remaining in place. Herein and in the claims, the term "foraminous" is used in its broadest sense and is intended to cover a sheet metal or plastic liner provided with a plurality of perforations, an openwork net liner or a wire mesh liner as shown in FIG. 3. The upper end of liner 2 may be provided with easily grasped handle means (not shown) for convenience in removal and installation.

The cover assembly may be molded of plastic or fabricated of metal as shown. Since vessel 1, in the embodiment illustrated is shown to be of circular cross section with a circular side wall slightly tapering upwardly and outwardly, the cover assembly is also shown to be of circular configuration. It will be understood that if vessel 1 had some other transverse cross sectional configuration, the cover assembly 3 could readily be configured appropriately to fit thereon.

Cover assembly 3 comprises a horizontal portion 6 terminating at its edge in a downwardly depending, vertical, annular wall 7. Adjacent the bottom edge of annular wall 7 there is an annular horizontal portion 8 provided with a downwardly depending annular flange or skirt 9. As is most clearly shown in FIG. 3, the annular horizontal portion 8 rests upon the upper edge of vessel 1 and the annular skirt 9 extends downwardly about the uppermost portion of vessel 1. Annular vertical wall 7 of cover assembly 3 is provided with at least one opening. Preferably, annular wall 7 is provided with a plurality of openings evenly spaced thereabout. This renders the trap accessible from all directions. While the number of openings does not constitute a limitation on the present invention, four openings evenly spaced about annular wall 7 has been found to be a convenient and sufficient number. Four such openings are illustrated in FIGS. 1 through 3 at 10 through 13. An arcuate, tubular, open ended conduit 14 is affixed at one of its ends in opening 10 of sidewall 7. The conduit 14 extends radially inwardly and downwardly and serves as an entrance passage for the trap at opening 10. Openings 11, 12, 13 are similarly provided with identical conduit or passage means 15, 16 and 17, respectively.

The horizontal portion 6 of cover assembly 3 has a central perforation 18 formed therein. Extending through perforation 18 there is a tubular bait container 19. The tubular bait container is welded to horizontal portion 6 of cover assembly 3 as at 20. Tubular bait container 19 has a closed lower end 21 which extends just below the inside ends of radial passage conduits 14 through 17. The tubular bait container 19 has an open upper end 22 provided with a cap 23. Cap 23 enables access to the interior of tubular bait container 19 for the insertion of appropriate bait therein. The lower portion of the cylindrical wall of tubular bait container 19 is provided with a plurality of perforations 24 exposing the bait within container 19.

Tubular bait container 19 is provided with a support means for a tiltable platform to be described hereinafter. The support means may take a number of forms including a rod-like member welded or otherwise affixed to the bottom end 21 of tubular member 19. For purposes of an exemplary showing, the support is illustrated as comprising a rod-like element 25 extending axially through the tubular bait container 19 and extending axially of vessel 1. The rod 25 passes through a perforation 26 in the bottom end 21 of tubular bait container 19 and a perforation 27 in the tubular bait container cap 23. The upper end of rod 25 is threaded as at 28 and the rod is held in place by a wing nut 29 or the like. At its lower end, the rod is provided with a substantially spherical bulb 30.

A tiltable platform is shown at 31 in FIG. 3. The tiltable platform comprises a disc-like member having a diameter slightly less than the internal diameters of vessel 1 and liner 2. The disc-like tilting platform 31 has a central perforation 32 through which rod 25 extends. The perforation 32 is of greater diameter than rod 25, but of lesser diameter than spherical bulb 30. The diameter of perforation 32 should be such as to permit platform 31 to assume a tilted configuration at an angle at least about 45° to the horizontal as is shown in broken lines. Other modes of attachment of platform 31 to the lower end of rod 25 may be employed, so long as they are universal in nature, permitting the platform to tilt in any direction. In the embodiment shown, tightening or loosening of wing nut 29 will adjust the height of tilting platform 31 to the desired level above water bath 5 and with respect to the inner ends of radially oriented passages 24 through 17.

The small animal trap of the present invention having been described, its operation may be set forth as follows. Vessel 1 is located in the ground as shown in FIG. 3. The liner 2 is placed within vessel 1 and the water bath (if used) is provided. The tubular bait container 19 is filled with appropriate bait material and cap 23 is placed thereon. The wing nut 29 is tightened to maintain cap 23 in place and to appropriately adjust the position of the tilting platform 31. The cover assembly 3 is then located on the upper edge of vessel 1 and the trap is ready for operation.

A small animal to be trapped is attracted by the bait within the tubular bait container 19 and enters any one of openings 10 through 13 and its respective conduit or passage 14 through 17. As the animal approaches the bait exposed by perforations 24 in the tubular bait container 19, it will attempt to stand on tilting platform 31. Tilting platform 31 will give way beneath the animal's weight discharging the animal into the bottom of the vessel and into water bath 5, if used. Once the animal has been discharged by tilting platform 31, it cannot again gain access to the inner end of any one of passages 14 through 17 because it will be prevented from so doing by tilting platform 31. Periodically, cover assembly 3 is removed and trapped animals are lifted from vessel 1 by means of liner 2. If the adjusted position of tilting platform 31 is of sufficient length beneath the lower end 21 of tubular bait container 19, the bait container can be refilled without removal of cover assembly 3 by simply lifting cap 23 upwardly. Otherwise, wing nut 29 may be turned a sufficient amount to enable this to be done.

FIGS. 4 and 5 illustrate a second embodiment of the present invention. While size does not constitute a limitation of the present invention, the embodiment of FIGS. 4 and 5 is particularly adapted for use as a small trap for small animals such as mice or the like. The trap, generally indicated at 33, comprises a vessel 34 and a cover 35. The vessel 34 may be of any suitable type such as a small bucket, can or the like. For purposes of an exemplary showing, the vessel 34 is illustrated as being a plastic vessel of about 1 gallon capacity. In the exemplary embodiment shown, the vessel 34 is open at its upper end which is provided with a rolled peripheral flange 36. As in the embodiment of FIGS. 1 through 3, the vessel 34 may be located in the ground with just enough of the upper portion of the vessel being above ground to accommodate cover 33. Alternatively, the vessel may simply be located on an appropriate solid support surface. While vessel 34 is shown as having a circular cross section, a vessel could be used having other cross sectional configurations.

Cover 33 again could be made of any appropriate material. In the embodiment shown, it is molded of resilient plastic material, and has a planar circular configuration, provided with a downwardly depending annular flange or skirt 37. It will be understood that cover 33 will be appropriately configured to match the cross sectional configuration of vessel 34. The annular skirt 37 may be provided with an internal flange 38, adapted to engage the rolled flange 36 of vessel 34 when cover 33 is located in place thereon. This gives the cover 33 a snap-fit engagement with the open end of vessel 34.

The cover 33 has at least one opening in its horizontal, planar portion, so sized as to permit the passage of a small animal therethrough. While the number of such openings does not constitute a limitation on the present invention, the embodiment of FIGS. 4 and 5 is shown as having two such openings at 39 and 40.

Cover 33 has a small central opening 41 adapted to receive the upper end of an elongated support 42 which depends downwardly from cover 33 and extends axially into vessel 34. While support 42 may constitute a threaded rod-like element (similar to rod-like element 25 of FIG. 3), provided with a substantially spherical bulb (similar to spherical bulb 30 of FIG. 3), for purposes of an exemplary showing the support 42 of FIGS. 4 and 5 is illustrated as being an elongated, threaded bolt. The support or bolt 42 is affixed to cover 33 by means of nuts 43 and 44, located on either side of cover 33. By appropriate adjustment of nuts 43 and 44, the length of support 42 extending into vessel 34 can be adjusted.

A tiltable platform is shown in FIG. 5 at 45. As in the embodiment of FIG. 3, the tiltable platform 45 comprises a disc-like member having a diameter slightly less than the internal diameter of vessel 34. Platform 45 has a central perforation 46 through which bolt 42 extends. The perforation 46 is of greater diameter than the shank 42a of bolt 42, but of less diameter than the head 42b of bolt 42. Once again, the diameter of perforation 46 should be such as to permit the platform 45 to be universally tiltable, with a tilt angle of at least about 45° to the horizontal. Other modes of attachment of platform 45 to the bottom end of support 42 can be used, so long as they are universal in nature, permitting the platform to tilt in any direction.

The operation of the embodiment of FIGS. 4 and 5 is similar to that of the embodiment of FIGS. 1 through 3. In this instance, however, since no bait container such as container 19 of FIG. 3 is provided, appropriate bait is simply located on platform 45 or on the lower end of support 42 near platform 45. The cover 33 is then mounted on vessel 34. An animal, attracted by the bait, will enter through one of perforations 39 and 40 and will attempt to stand upon platform 45. The platform will give way beneath the weight of the animal and the animal will be discharged into the bottom of vessel 34.

If the trap is intended to kill as well as trap the small animal, vessel 34 can be provided with a water bath (not shown) constituting from about one-fourth to about one-third the volume of vessel 34. It will be understood that vessel 34 could also be provided with a foraminous liner such as liner 2 of FIG. 3.

Modification may be made in the invention without departing from the spirit of it.

What is claimed is:

1. A trap for small animals such as rodents and the like comprising a vessel having an open upper end and a removable cover assembly closing said open upper end of said vessel, said vessel being adapted to be located in the ground with said open upper end thereof extending above ground level by an amount sufficient to receive said cover assembly, a tubular bait container affixed to and extending through said cover assembly said tubular bait container extending vertically and axially of said vessel when said cover assembly is mounted thereon, said tubular bait container having a closed lower end below said cover assembly and an open upper end above said cover assembly, a removable cap for said upper open end of said bait container, said bait container having a cylindrical side wall with a plurality of bait exposing perforations formed therein near the lower end thereof, said cover assembly having a substantially vertical wall portion provided with at least one opening therein, a curved conduit extending inwardly and downwardly from said opening toward said lower end of said bait container, a support attached to said bait container and extending vertically downwardly thereof and axially of said vessel and a universally tiltable platform mounted on the lower end of said support.

2. The structure claimed in claim 1 including a removable foraminous liner for said vessel.

3. The structure claimed in claim 1 including a water bath within said vessel below said tiltable platform.

4. The structure claimed in claim 1 wherein said vessel is of circular transverse horizontal cross section, said cover assembly also being of circular configuration having an annular horizontal portion resting upon said upper open end of said vessel, said substantially vertical wall portion of said cover assembly being annular and having a plurality of openings formed therein and evenly spaced thereabout, each of said openings having a curved conduit connected thereto, said conduits extending radially inwardly of said wall portion and downwardly toward said lower end of said bait container.

5. The structure claimed in claim 1 wherein said support comprises an elongated rod, said rod extending axially of said tubular bait container through perforations in said closed lower end thereof and said cap therefor, the upper end of said rod extending through said perforation in said cap being threaded and provided with an adjustment nut.

6. The structure claimed in claim 2 including a water bath within said vessel below said tiltable platform.

7. The structure claimed in claim 4 wherein said openings in said substantially vertical annular wall portion of said cover assembly are four in number.

8. The structure claimed in claim 4 wherein said support comprises an elongated rod, said rod extending axially of said tubular bait container through perforations in said closed lower end thereof and said cap therefor, the upper end of said rod extending through said perforation in said cap being threaded and provided with an adjustment nut, said tiltable platform comprising a disc-like element, the lower end of said rod extending with clearance through a centrally located perforation in said tiltable platform and means on said lower end of said rod below said platform to support said platform and to permit universal tilting thereof.

9. The structure claimed in claim 8 including a removable foraminous liner for said vessel.

10. The structure claimed in claim 9 including a water bath within said vessel below said tiltable platform.

11. A trap for small animals such as rodents and the like comprising a vessel having an open upper end and a removable cover closing said open upper end of said vessel, said cover having a peripheral downwardly depending skirt engaging said open upper end of said vessel about its periphery, said cover having at least one opening therein, a rigid one piece rod-like support attached to said cover and extending vertically downwardly thereof and axially of said vessel, a universally tiltable platform, said platform having a central perforation, said rod-like support extending through said platform perforation with clearance, said rod-like support having an enlarged lower end below said platform configured to normally support said platform in a horizontal position and to permit universal tilting of said platform.

12. The structure claimed in claim 11 including a removable foraminous liner for said vessel.

13. The structure claimed in claim 11 including a water bath within said vessel below said tiltable platform.

14. The structure claimed in claim 11 including a central perforation in said cover, said rod-like support comprising an elongated threaded bolt adjustably mounted in said perforation by a pair of nuts located above and below said cover and in abutment therewith, said bolt having a head at that end thereof extending into said vessel, said platform perforation having a diameter less than the diameter of said bolt head, said platform normally being supported by said bolt head in a horizontal position within said vessel.

* * * * *